(12) United States Patent
Azzola et al.

(10) Patent No.: US 6,212,211 B1
(45) Date of Patent: Apr. 3, 2001

(54) SHOCK WAVE DISSIPATING LASER CHAMBER

(75) Inventors: James H. Azzola; Paul R. Marsden; Richard C. Ujazdowski, all of San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/169,195

(22) Filed: Oct. 9, 1998

(51) Int. Cl.[7] .................................................. H01S 3/00
(52) U.S. Cl. .............................. 372/33; 372/92; 372/58; 372/104
(58) Field of Search .................................. 372/33, 92, 58, 372/104

(56) References Cited

U.S. PATENT DOCUMENTS

| 5,924,975 | * | 7/1999 | Goldowsky | 600/16 |
| 5,978,405 | * | 11/1999 | Juhasz et al. | 372/57 |

* cited by examiner

*Primary Examiner*—Leon Scott, Jr.
(74) *Attorney, Agent, or Firm*—Brian D. Ogonowsky, Esq.

(57) ABSTRACT

A laser chamber with a circuitous gas return path dissipates shock waves. In one embodiment, the laser chamber includes a heat exchanger with a large surface area that defines an aerodynamic passage through which gas circulates in the laser chamber. The passage through which the gas circulates directs shock waves away from the discharge region so that the shock waves may dissipate elsewhere in the laser chamber. In addition, the large surface area of the heat exchanger efficiently cools the thermally energetic gas within the laser chamber. In another embodiment, ancillary chambers that are fluidically coupled to the main laser chamber are provided to permit shock waves to be directed away from the discharge area and to be dissipated within the ancillary chambers. Openings to the ancillary chambers are positioned such that shock waves generated by the electrode structure of the laser chamber may propagate directly into the ancillary chamber, where the shock waves then dissipate. Flow guides, such as blowers or flow vanes, may be provided in the ancillary chambers to generate a circulation of gas within the ancillary chambers that will support the laser chamber's flow of gas at the openings to the ancillary chambers. Thus, the circulating gas within the laser chamber remains uniform and stable.

18 Claims, 8 Drawing Sheets

SHOCK WAVE DISSIPATING LASER CHAMBER

FIELD OF THE INVENTION

The present invention relates to a laser chamber, such as that used with a pulsed energy laser, and in particular the present invention relates to laser chambers having shock wave dissipation properties.

BACKGROUND

Figure 1:
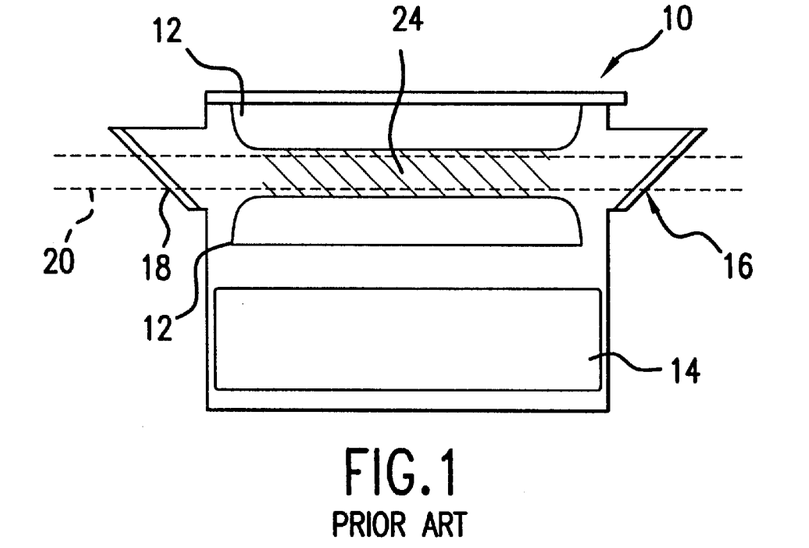
FIG. 1 is a side view of a conventional laser chamber used in a pulsed laser system.

Pulsed laser systems, such as excimer lasers, are well known. FIG. 1 is a side view of a laser chamber 10 used in a pulsed laser system. Laser chamber 10 includes an electrode structure 12, a blower 14, windows 16, 18, a laser beam 20. Between electrode structure 12 is the laser discharge region 24.

Figure 2:
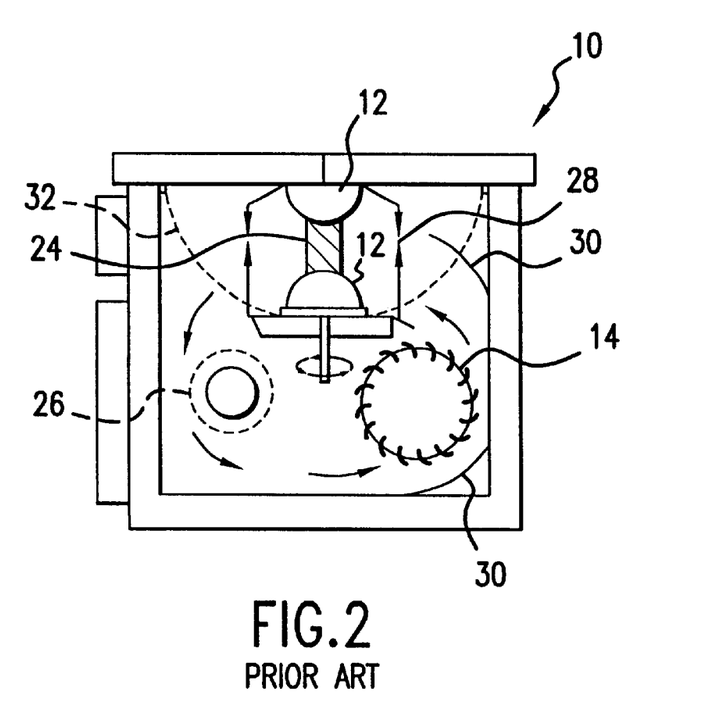
FIG. 2 is a front view of a conventional laser chamber used in a pulsed laser system.

FIG. 2 is a front view of laser chamber 10. As shown in FIG. 2, laser chamber 10 additionally includes heat exchanger 26, a pre-ionizer 28, baffles 30 and a current return 32, which is used to connect the lower of electrodes 12 to ground.

As well known by those skilled in the art, a pulsed laser system, such as an excimer laser, produces high energy, high frequency pulses in a gas that is between electrodes 12 in laser chamber 10. The gas, which may contain krypton and fluorine, is maintained at high pressure, for example 3 atm. Pre-ionizer 28 first floods the gas within discharge area 24 with free electrons ($10^6$ to $10^7$ per $cm^3$). Once the gas within discharge area 24 is conditioned with a sufficiently increased electron density, electrodes 12 produce a high energy discharge, which may be for example 15–50 kV. The lasing action from the high energy discharge occurs within 100 nsec from the time of discharge.

The high energy discharge in discharge area 24 produces a large amount of local heating and pressure disturbances in the gas. The thermal and pressure disturbances change the index of refraction of the gas, which has a deleterious effect on the energy efficiency of the laser system. The high energy discharge of the gas does not affect the lasing action from the pulse that caused it because the lasing action occurs within a short amount of time after the high energy discharge, approximately 100 nsec. However, subsequent high energy discharges, which occur at a frequency of approximately 1 KHz, will be produced in the highly disturbed, thermally energetic gas unless the gas is circulated within laser chamber 10. Thus, blower 14 is used to circulate the gas within laser chamber 10. Heat exchanger 26 is placed in the path of the gas flow to cool the gas as it circulates. Typically, the gas in laser chamber 10 is circulated at a speed of 20–30 meters per second through discharge region 24, however, this speed is dictated by the frequency of the pulsed laser system.

It is desirable for the circulating gas within laser chamber 10 to be as uniform and as stable as possible, i.e., thermally, optically, and kinetically stable, because a stable gas maximizes the energy output of the laser system. One cause of disturbance in the gas is shock waves generated from the high energy discharge from electrodes 12. Shock waves from the high energy discharge are reflected by the walls of laser chamber 10, as well as from heat exchanger 26 and other components, back into discharge area 24 where the shock waves interfere with the energy output of the pulsed laser system.

Another cause of disturbance in the gas that is circulating within laser chamber 10 is heat exchanger 26. Although heat exchanger 26 is necessary to cool the thermally excited gas, heat exchanger 26 acts as a choke to the gas flow within laser chamber 10. Consequently, blower 14 is required to overcome the impedance of heat exchanger 26. Further, the position and configuration of heat exchanger 26 disturbs the uniformity of the circulating gas. Fins (not shown) on heat exchanger 26 are conventionally used to assist in heat exchange. However, fins, which are typically one inch high and 0.1 inch apart, further impede the flow of the circulating gas.

In addition, laser chamber 10 fails to circulate the entire volume of gas. The flow of the gas in laser chamber 10 is illustrated by arrows, as shown in FIG. 2. Baffles 30 are used in conjunction with blower 14 to guide the gas flow around laser chamber 10, nevertheless, there are typically dead areas within laser chamber 10 where the gas fails to circulate properly. For instance, laser chamber 10, as shown in FIG. 2, has a dead area in the center of laser chamber 10 where the gas circulates in a small area, i.e., an eddy, and thus fails to circulate throughout laser chamber 10.

SUMMARY

A laser chamber in accordance with an embodiment of the present invention redirects the shock waves away from the discharge area and into other areas of the laser chamber where the shock waves can be dissipated. In conventional systems, the walls of the laser chamber, the heat exchanger and/or other components within the laser chamber provide surfaces for shock waves to be deflected back into the discharge region, thereby disturbing the energy stability of subsequent pulses. Thus, a laser chamber that redirects the shock waves away from the discharge area to be dissipated elsewhere advantageously maintains stability of the gas within the discharge area during pulsing.

One embodiment of the laser chamber has an electrode structure that defines a laser discharge area, a blower that circulates gas within the laser chamber and a heat exchanger with a surface area that defines a passage for the gas circulating within the laser chamber. The circuitous path defined by the heat exchanger allows shock waves to be directed away from the discharge region and dissipated in other areas of the laser chamber. Further, the additional surface area of the heat exchanger efficiently cools the thermally excited gas. In some embodiments, the heat exchanger is curved to create an inner surface area defining a space, and an outer surface. A protrusion from the side wall of the laser chamber extends into the space defined by the heat exchanger thereby lengthening the passage for the circulating gas.

In another embodiment, the working volume of the laser chamber is increased through the addition of ancillary chambers. The ancillary chambers are fluidically coupled to the laser chamber and are positioned such that shock waves generated by high energy discharges of the electrodes propagate directly into the openings of the ancillary chambers. The shock waves may then dissipate within the ancillary chambers rather than being reflected back to the laser discharge area. Flow guides, such as blowers or flow vanes, may be included within the ancillary chambers. The flow guides within the ancillary chambers generate a circulation of gas within the ancillary chambers that supports the circulating gas within the laser chamber at the openings of the ancillary chambers. The flow guides (or other baffles) within the ancillary chambers also act to trap the shock waves within the ancillary chamber, allowing the shock waves to dissipate through the action of multiple reflections within the ancillary chambers. Thus, the gas flow within the laser chamber remains stable and uniform.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 2A:
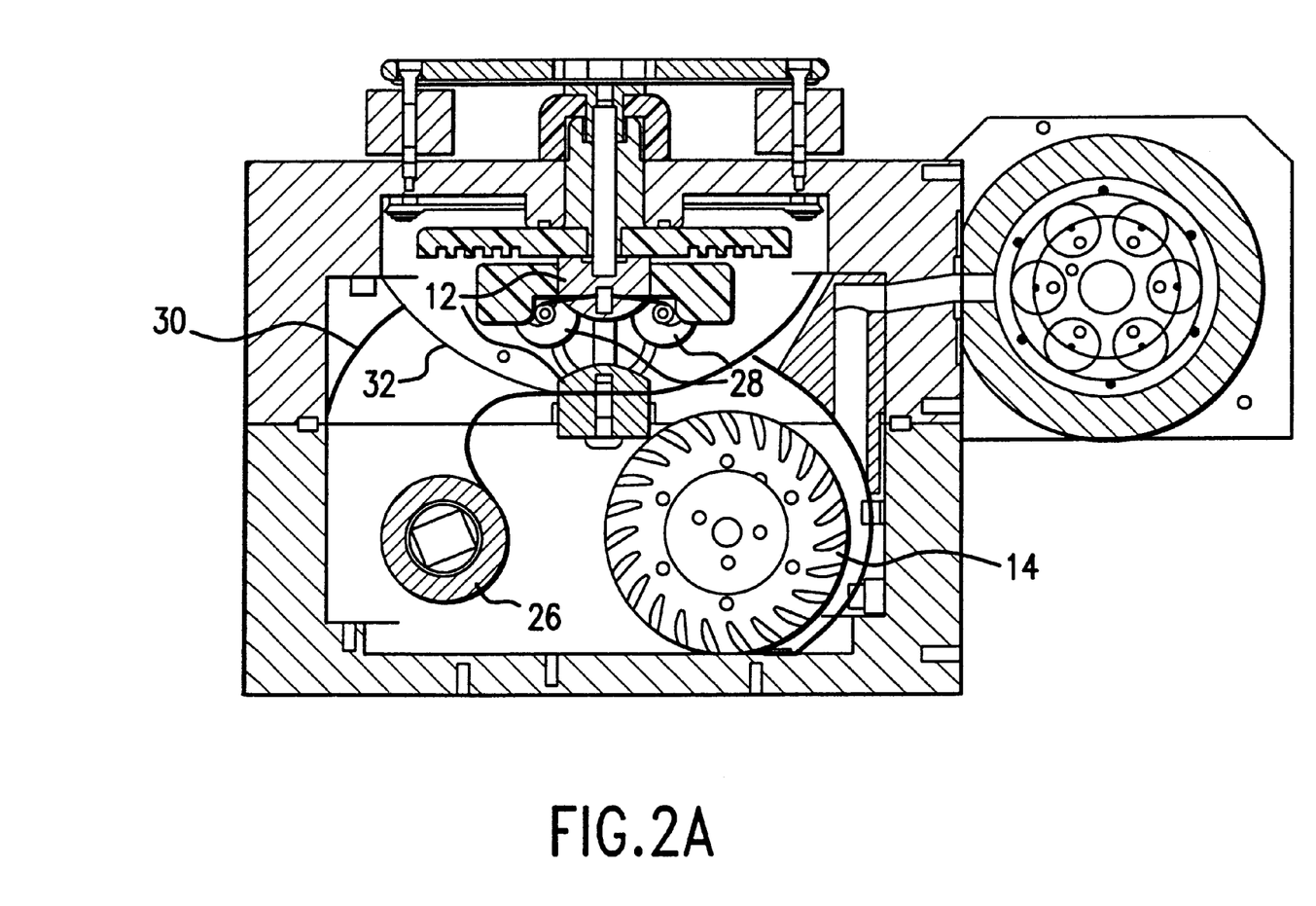
FIG. 2A is a front view of a state of the art laser chamber.

FIG. 2A is the front view of a laser chamber of a state-of-the-art excimer laser. The drawing shows electrodes 12, blower 14, heat exchanger 26, pre-ionizers 28, baffles 30 and current return 32.

Figure 3:
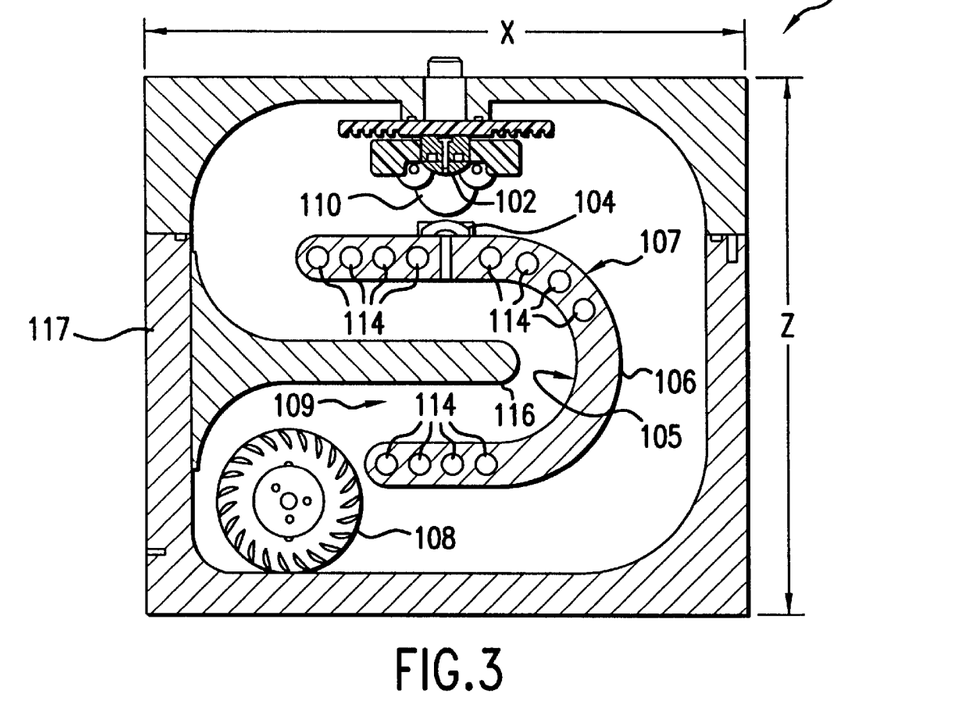
FIG. 3 is a front view of a laser chamber with an expanded working volume and a heat exchanger defining a path for the circulating gas.

FIG. 3 is a front view of a laser chamber 100 with an expanded working volume in which shock waves may be dissipated. Laser chamber 100 includes electrodes 102, 104, a heat exchanger 106 with a large surface area that acts as a flow vane for the circulating gas, and a blower 108. FIG. 3 also shows the back window 110 of laser chamber 100.

Figure 4:
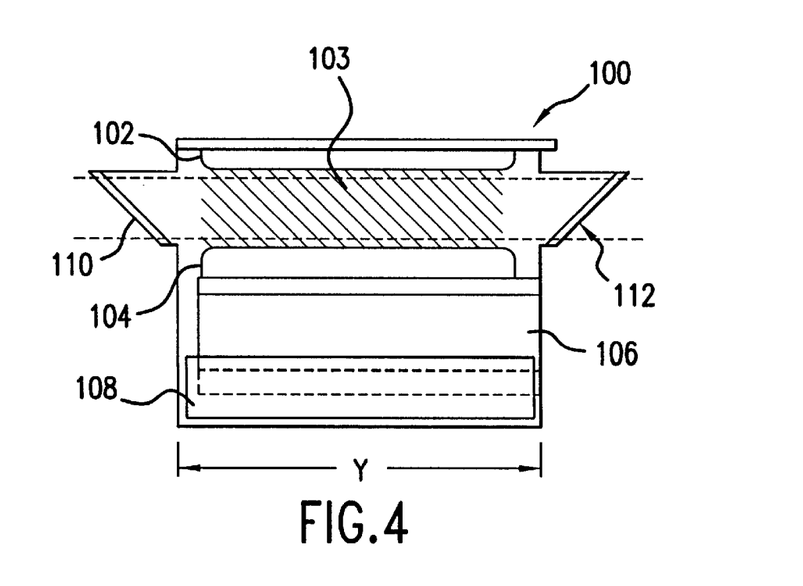
FIG. 4 is a side view of the laser chamber from FIG. 3.

FIG. 4 is a side view of laser chamber 100. FIG. 4 shows electrodes 102, 104 with electrode 104 positioned adjacent to heat exchanger 106 and laser discharge zone 103 between electrodes 102 and 104. FIG. 4 also shows blower 108, back window 110, and front window 112.

It will be understood by those skilled in the art that electrodes 102, 104 include conventionally used devices, such as a pre-ionizer, current return and insulator, however, these devices are not shown in FIGS. 3 and 4 for the sake of clarity. It should be understood that electrodes 102, 104 and blower 108 may be of the type conventionally used in a pulsed laser system. Electrodes 102, 104, for example, may be the type used in Excimer Laser Model 5000, produced by CYMER, Inc. in San Diego, Calif. Additionally, blower 108 may be supported by either a mechanical bearing or a magnetic bearing.

Laser chamber 100, including electrodes 102, 104, heat exchanger 106 and blower 108 are manufactured out of materials compatible with the specific gases used in laser chamber 100, e.g., fluorine and krypton. For example, electrodes 102 and 104 may be manufactured from brass and insulated with ceramic, while other devices within laser chamber 100, such as heat exchanger 106, blower 108, and the walls of laser chamber 100 may be manufactured with nickel plated aluminum or steel. Of course, other materials that are compatible with the specific gas mixture may be used in laser chamber 100.

The outside dimension of laser chamber 100, as shown in FIG. 3, is approximately 325 mm in the Z direction, 350 mm in the X directions, and 725 mm in the Y dimension, as shown in FIG. 4. The inner dimensions of laser chamber 100 are approximately 275 mm in the Z direction, 300 mm in the X direction, and 675 mm in the Y direction.

The working volume of laser chamber 100 shown in FIG. 3, is approximately 45,000 cm$^3$, which is two to three times larger than working volumes used in conventional laser chambers.

Heat exchanger 106 in laser chamber 100, as shown in FIG. 3, is curved 180 degrees into a sideways U shaped configuration. The curvature of heat exchanger 106 forms an inner surface area 105, which defines a space 109 and an outer surface area 107. A protrusion 116 of the wall 117 of laser chamber 100 extends into space 109 defined by inner surface area 105 of heat exchanger 106. Consequently, a long continuous path is created by the surface of heat exchanger 106 and protrusion 116, through which the gas within laser chamber 100 circulates. The circuitous path also permits shock waves to be directed away from the discharge region and dissipated elsewhere in laser chamber 100. Further, heat exchanger 106 does not provide a deflective surface to redirect the shock waves back into the discharge region.

The performance of heat exchanger 106 is improved because the thermally excited gas is exposed to a greater surface area of heat exchanger 106. Consequently, heat exchanger 106 removes heat from the circulating gas more efficiently than with heat exchangers in conventional laser chambers. Due to the greater surface area of heat exchanger 106, smaller fins (not shown) on heat exchanger 106 may be used. For example, fins may be used with heat exchanger 106 that are parallel to the flow of the gas, and that extend approximately a quarter inch into the gas flow and are spaced a quarter inch apart. Thus, fins used with heat exchanger 106 generate less disturbance in the gas flow than found in conventional systems.

Heat exchanger 106 includes several tube like voids 114 through which flows the cooling medium. Of course the particular number of voids 114 carrying cooling medium may vary as desired to efficiently cool the thermally excited gas in laser chamber 100. The cooling medium, water for example, flows through heat exchanger 106 at approximately two gallons per minute, and is at a temperature of approximately 18 to 25 degrees Celsius. Other flow rates and temperatures may be used as desired to control the temperature of the gas within laser chamber 100.

The voids 114 in heat exchanger 106 may carry the cooling medium in a serial or parallel fashion. For example, voids 114 may include several tubes that run independently through heat exchanger 106 or may be only one tube that winds throughout heat exchanger 106. Heat exchanger 106 may be connected to both the front end and the back end of laser chamber if, for example, voids 114 have a parallel configuration through heat exchanger 106, or heat exchanger may be connected to only one end, as shown in FIG. 4, where voids 114 have a serial configuration. Of course, other configurations of voids 114 are possible, such as having multiple serial voids 114 running through heat exchanger 106.

Heat exchanger 106 also serves as a flow vane, defining the circulation path of the gas within laser chamber 100.

Thus, heat exchanger 106 is not an obstruction to the flow of gas as found in conventional systems, but rather produces an aerodynamic path through which the gas may circulate.

As will be understood by those skilled in the art, other heat exchanger 106 configurations are possible. For example, the curvature of heat exchanger 106 may be more obtuse with the surface of protrusion 116 following the curve of heat exchanger 106.

Figure 5:
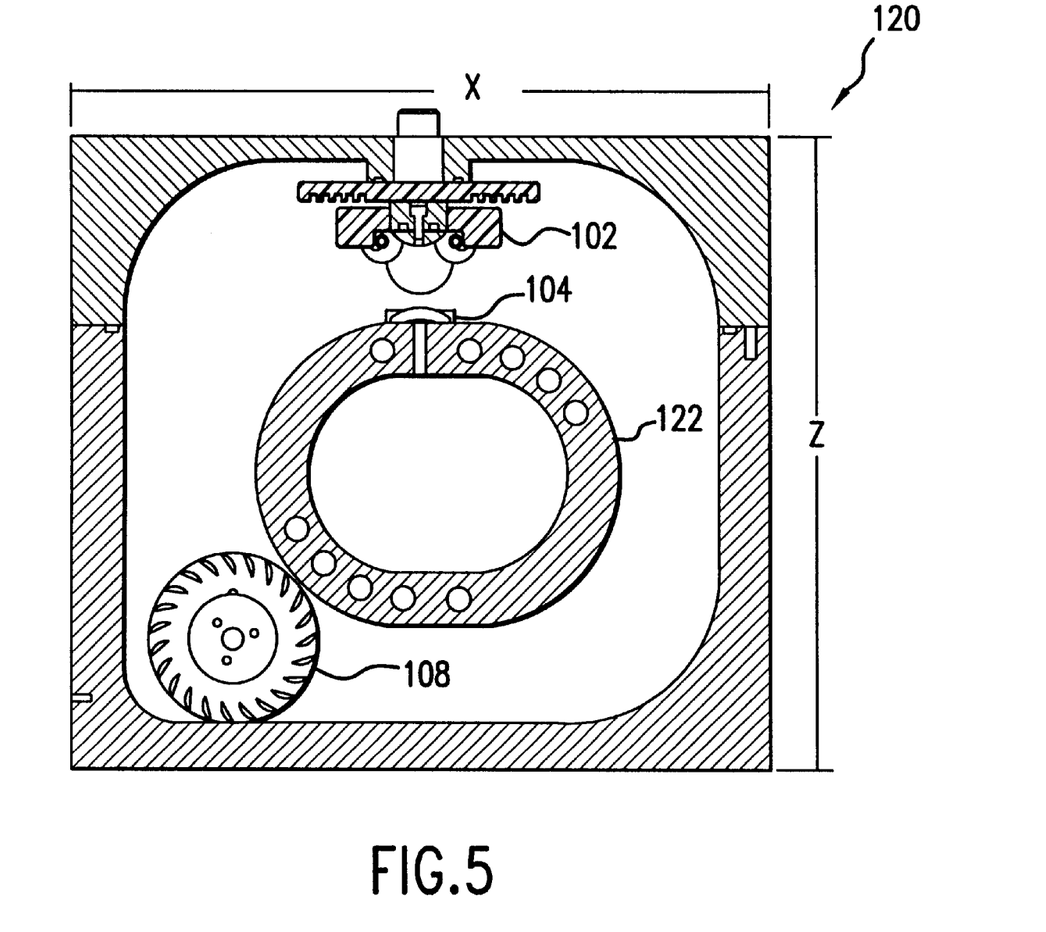
FIG. 5 shows a front view of a laser chamber with an oval heat exchanger that defines a path for the circulating gas.

FIG. 5 shows a laser chamber 120 with an oval heat exchanger 122 in the center. Similar to laser chamber 100, laser chamber 120 improves shock wave dissipation by providing a circuitous path defined by heat exchanger 122 to permit shock waves to be directed away from the discharge area and dissipated elsewhere. Heat exchanger 122 is similar in manufacture and operation to heat exchanger 106, shown in FIG. 3. Heat exchanger 122 has an increased surface area relative to heat exchangers in conventional laser chambers. Further, heat exchanger 122 generates a gas circulation path in which, unlike heat exchanger 106, there are no 180 degree turns. Thus, with the use of heat exchanger 122, blower 108 is not required to push the gas around sharp 180 degree curves. However, the circulation path defined by heat exchanger 122 is shorter than that created by heat exchanger 106. Moreover, the shape of heat exchanger 122 defines a large dead space in the center of laser chamber 100. Thus, there is a decreased working volume with the use of heat exchanger 122 relative to heat exchanger 106.

Figure 6:
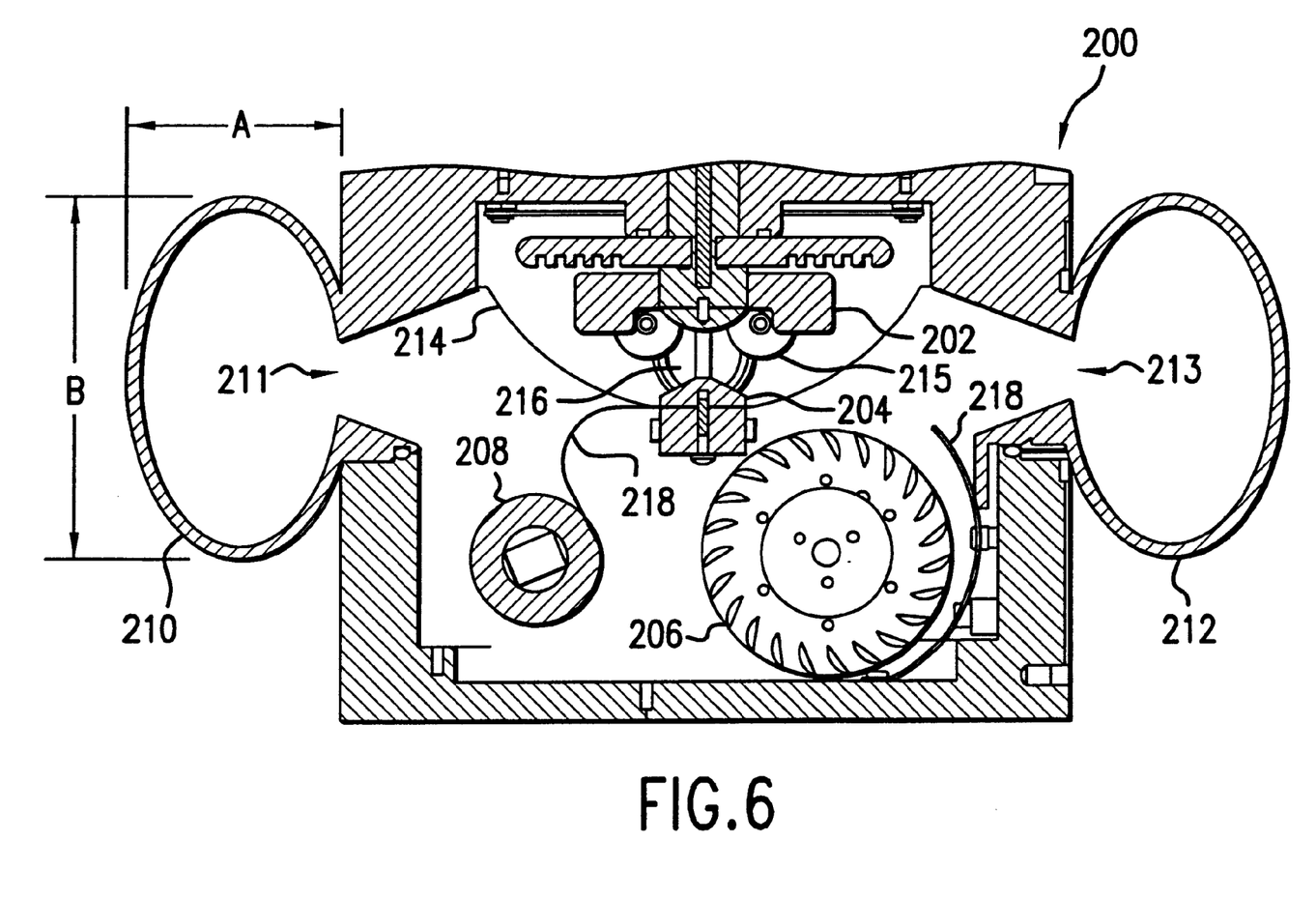
FIG. 6 is a front view of a laser chamber with ancillary chambers providing additional working volume.

FIG. 6 is a side view of another embodiment of a laser chamber 200 with shock dissipating properties. As shown in FIG. 6, laser chamber 200 includes electrodes 202, 204, blower 206, heat exchanger 208, and two ancillary chambers 210 and 212. As shown in FIG. 6, laser chamber 200 also includes a current return 214, back window 216, and baffles 218. Laser chamber 200 may be similar in size and manufacture as laser chamber 10 shown in FIGS. 1 and 2, however, ancillary chambers 210 and 212 permit shock waves to be directed away from the discharge area and to be dissipated elsewhere, i.e., within ancillary chambers 210 and 212.

The components used in laser chamber 200, such as electrodes 202, 204, which include the pre-ionizers 215, current return 214, and heat exchanger 208 may be conventional components, for example the type that are used in Excimer Laser Model 5000, by CYMER, Inc. Blower 206 may be a conventional mechanical bearing blower, such as the type used in the Model 5000 or a magnetic bearing, such as the type described in reference to FIG. 3.

Figure 7:
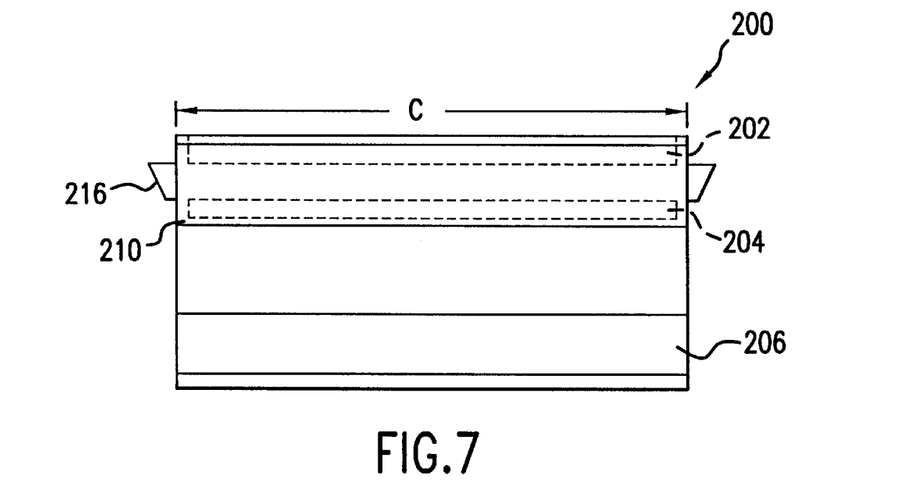
FIG. 7 shows a side view of the laser chamber from FIG. 6.
Figure 8:
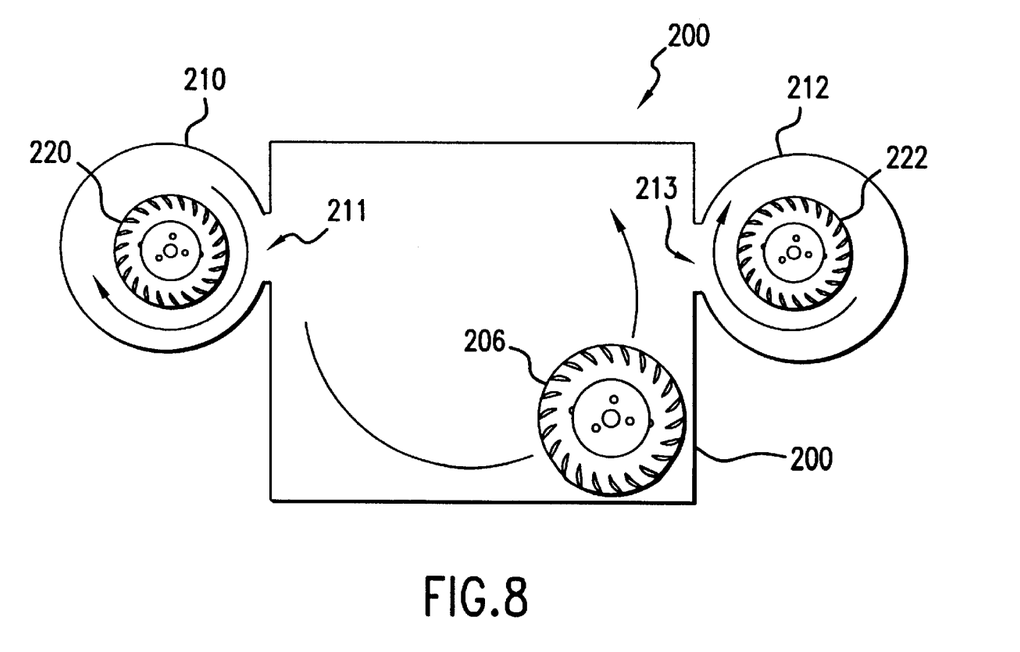
FIG. 8 shows a front view of a laser chamber with ancillary chambers and shows the direction of gas flow within the laser chamber and ancillary chambers.

Ancillary chambers 210 and 212 are fluidically connected to laser chamber 200 via converging openings 211 and 213. Ancillary chambers 210 and 212 are approximately 100 mm in the direction labeled A, 150 mm in the direction labeled B, and are substantially the length of laser chamber 200, illustrated as direction C in FIG. 7. FIGS. 7 and 8 show a respective side view and front view of laser chamber 200. Ancillary chambers 210 and 212 may extend to the ends of laser chamber 200 or may be short of the ends, for example, by two inches on either side. Openings 211 and 213, however, extend the entire length of electrodes 202 and 204. It is understood that ancillary chambers 210 and 212 may differ in shape and size than that shown in FIG. 6. For example, ancillary chambers 210 and 212 may be round, square, or rectangular.

Openings 211 and 213 are positioned in line with electrodes 202, 204 so that shock waves generated by the high energy discharge of electrodes 202, 204 propagate directly into ancillary chambers 210 and 212. Openings 211 and 213 are shown as converging which assists in the propagation of shock waves into ancillary chambers 210 and 212.

Ancillary chambers 210 and 212 create additional volume to laser chamber 200 in which shock waves are permitted to dissipate. Moreover, ancillary chambers 210 and 212 are configured such that once shock waves enter openings 211 and 213 the shock waves are reflected within ancillary chambers 210 and 212 rather than being reflected directly back towards electrodes 202, 204. Thus, the shock waves are substantially dissipated within ancillary chambers 210 and 212 thereby avoiding interference with subsequent high energy discharges produced by electrodes 202, 204. A parabolic or oval configuration, such as the type shown in FIG. 6, may be used to maintain the reflected shock waves within ancillary chambers 210 and 212. In other embodiments, ancillary chambers 210 and 212 may include baffles (not shown) to guide shock waves within ancillary chambers 210 and 212 and to prevent shock waves from exiting ancillary chambers 210 and 212 prior to being substantially dissipated.

As shown in FIG. 8, ancillary chambers 210 and 212 may each contain a flow guide, such as a blower 220, 222 and/or flow vanes (not shown), for generating a flow of gas within ancillary chambers 210 and 212. The gas within ancillary chambers 210 and 212 circulates in a direction opposite the circulation direction within the main laser chamber 200, as shown in FIG. 8. Because the circulation directions are opposite, at openings 211 and 213 the gas within main chamber 200 is flowing in the same direction as the gas in ancillary chambers 210 and 212. Thus, the flow of gas in ancillary chambers 210 and 212 supports the flow of gas within main chamber 200. The inter-supported gas permits the circulating gas within main chamber 200 to maintain its proper direction and integrity. Further, the inter-supported gas at openings 211 and 213 permits shock waves to pass from main chamber 200 to ancillary chambers 210 and 212 because the velocity of gas at openings 211 and 213 is much slower than the velocity of the shock waves, by approximately a factor of 10. Consequently, the shock waves may pass into ancillary chambers 210 and 212 were they are dissipated. Further, due to the controlled flow of gas within ancillary chambers 210 and 212, the circulation of gas within main chamber 200 remains uniform and stable.

Figure 9:
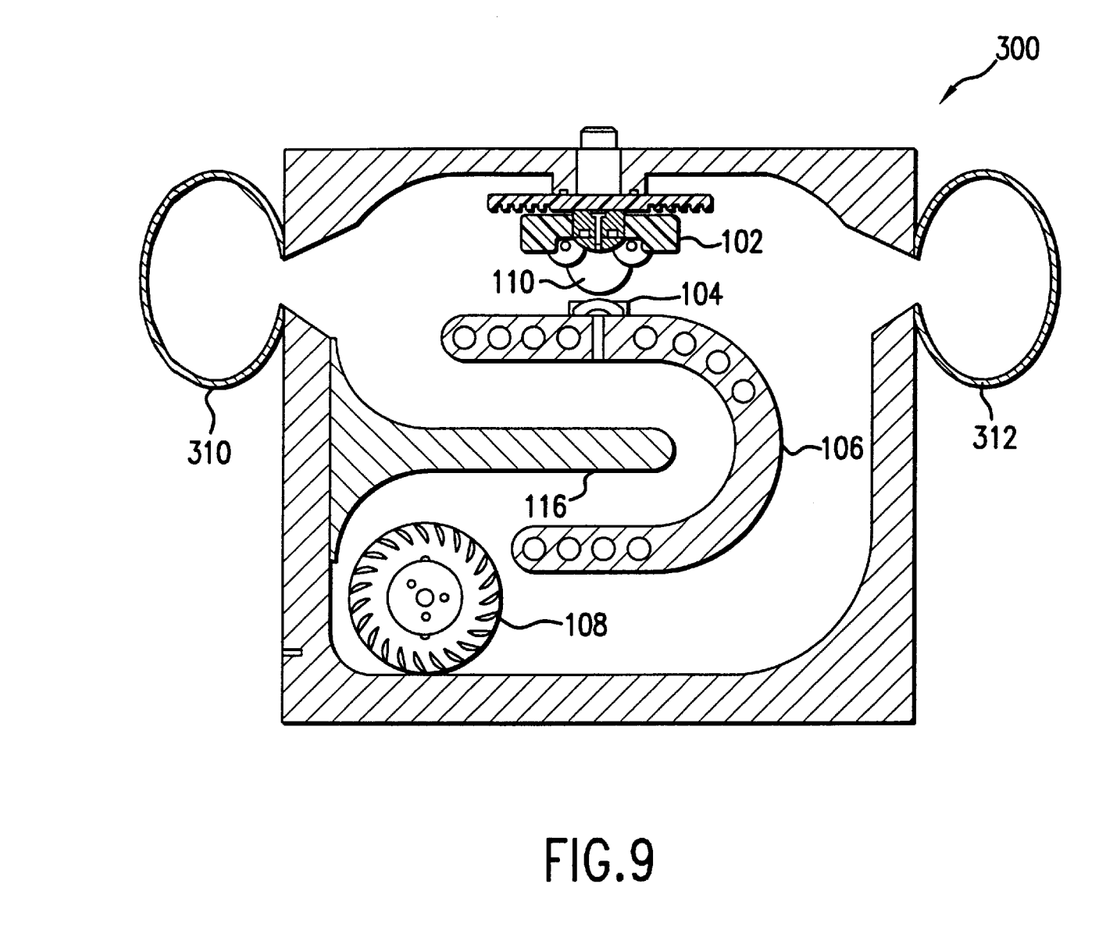
FIG. 9 shows a front view of the laser chamber shown in FIG. 3 with the addition of ancillary chambers.

FIG. 9 shows a front view of laser chamber 300, which is similar to laser chamber 100 shown in FIG. 3, like designated elements being the same. However, laser chamber 300 includes ancillary chambers 310 and 312, as shown in FIG. 6, fluidically coupled to laser chamber 300. Ancillary chambers 310 and 312 are similar in manufacture and use to ancillary chambers 210 and 212 shown in FIG. 6. Consequently, laser chamber 300 has the advantages of the ancillary chamber embodiment as well as the advantages found in laser chamber 100. Laser chamber 300 may also use differently configured heat exchangers 106, such as heat exchanger 122, shown in FIG. 5. Also, laser chamber 300 may have blowers or flow vanes within ancillary chambers 310 and 312.

Figure 10:
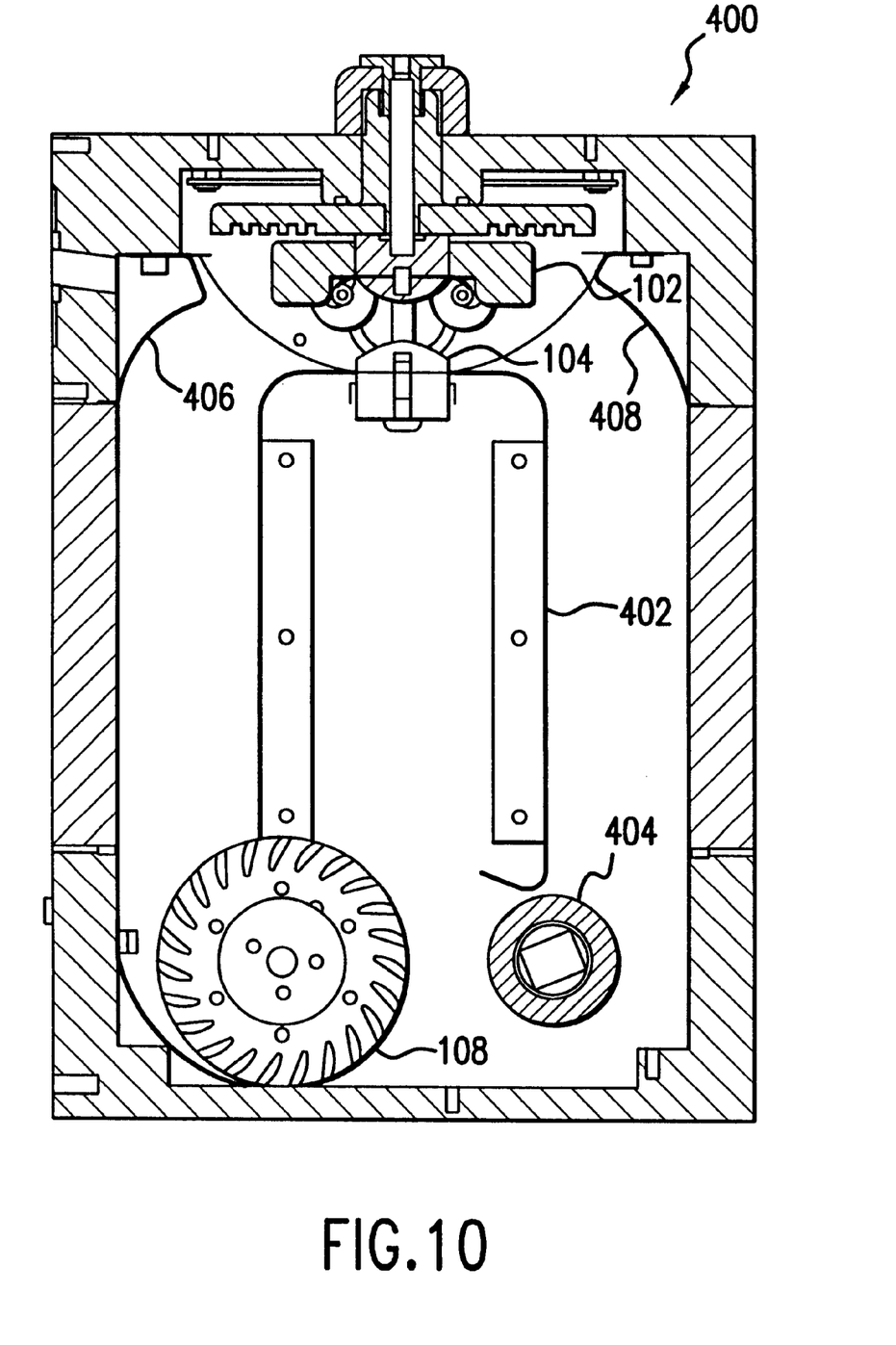
FIG. 10 shows a front view of a laser chamber with the addition of a middle section.

FIG. 10 shows a front view of laser chamber 400, which is similar to laser chamber 120 shown in FIG. 5, like designated elements being the same. Although laser chamber 400 includes a middle section 402 that extends the gas flow path through the chamber cavity, laser chamber 400 uses a conventional heat exchanger 404, for example the type that is used in Excimer Laser Model 5000, by CYMER, Inc. Laser chamber 400 advantageously has a circuitous return path defined by middle section 402, which along with baffles 406 and 408 direct shock waves away from the discharge region so that the shock waves may be dissipated elsewhere.

The added middle section 402 and its accompanying set of baffles also act to block the shock waves from directly traveling from the discharge region to the blower 108 and/or other internal components, as well as blocking their reflection directly back into the discharge region, as is possible with chamber 10 in FIG. 2.

Although embodiments of the present invention have been described in considerable detail with reference to certain variations thereof, other embodiments are possible. For example, different blowers or electrodes may be used within the scope of the invention. Further, additional components, such as baffles, current returns and pre-ionizers may be included in a laser chamber. Moreover, additional configurations may be used for heat exchanger 106 to provide an aerodynamic passage for the circulating gas as well to take advantage of the additional surface area. Additional heat exchangers may also be used, for example protrusion 116 may serve as a heat exchanger. Therefore, the spirit and scope of the appended claims should not be limited to the description of the versions depicted in the figures.

What is claimed is:

1. A shock wave dissipating laser chamber comprising
   at least one wall forming a portion of said laser chamber;
   an electrode structure enclosed within said laser chamber, said electrode structure comprising an anode and a cathode separated by a distance defining a laser discharge area;
   a heat exchanger;
   a blower for circulating a gas in a first direction through said laser discharge area and over said heat exchanger; and
   a first ancillary chamber fluidically coupled to said laser chamber by a first opening along said at least one wall to trap and dissipate shock waves produced by said electrode structure.

2. The laser chamber of claim 1, wherein;
   said first opening along said at least one wall is positioned adjacent to said laser discharge area;
   said anode and said cathode of said electrode structure define a first plane with respect to one another; and
   said first opening along said at least one wall and said laser discharge area define a second plane that is perpendicular to said first plane.

3. The laser chamber of claim 2, further comprising:
   a second ancillary chamber fluidically coupled to said laser chamber by a second opening along said at least one wall, wherein said second opening along said at least one wall is positioned adjacent to said laser discharge area along said second plane.

4. The laser chamber of claim 3, wherein said second ancillary chamber comprises:
   a second flow guide enclosed within said second ancillary chamber, said second flow guide circulates gas within said second ancillary chamber in a second direction, wherein said gas circulating within said laser chamber in a first direction and said gas circulating within said second ancillary chamber in a second direction are inter-supporting at said second opening along said at least one wall.

5. The laser chamber of claim 1, wherein said first ancillary chamber comprises:
   a flow guide enclosed within said first ancillary chamber, said flow guide circulates gas within said first ancillary chamber in a second direction, wherein said gas circulating within said laser chamber in a first direction and said gas circulating within said first ancillary chamber in a second direction are inter-supporting at said opening along said at least one wall.

6. The laser chamber of claim 1, wherein said flow guide enclosed within said first ancillary chamber is a second blower.

7. The laser chamber of claim 1, wherein said flow guide enclosed within said second ancillary chamber is a third blower.

8. A shock wave dissipating laser chamber comprising:
   at least one wall forming a portion of said laser chamber;
   an electrode structure enclosed within said laser chamber, said electrode structure comprising an anode and a cathode separated by a distance defining a laser discharge area;
   a middle section configured to trap and dissipate shock waves produced by said electrode structure having a surface, wherein the surface of said middle section and said at least one wall of said laser chamber define a path through which a gas circulates in said laser chamber; and
   a blower for circulating a gas through said path in a first direction.

9. The laser chamber of claim 8, further comprising a heat exchanger located in said path of said gas.

10. The laser chamber of claim 8, wherein said middle section is a heat exchanger, the surface of said heat exchanger and said at least one wall of said laser chamber define a path through which a gas circulates in said laser chamber.

11. The laser chamber of claim 10, wherein:
    said heat exchanger is curved to form an inner surface area defining a space and an outer surface area; and
    said at least one wall has a protrusion, said protrusion extends into said space defined by said inner surface area of said heat exchanger.

12. The laser chamber of claim 10, wherein said at least one of said anode and cathode of said electrode structure is coupled to said heat exchanger.

13. The laser chamber of claim 10, wherein said heat exchanger defines at least one tubular void through which a cooling medium flows.

14. The laser chamber of claim 13, wherein said heat exchanger defines multiple parallel tubular voids.

15. The laser chamber of claim 10, said laser chamber further comprising:
    a first ancillary chamber fluidically coupled to said laser chamber by a first opening along said at least one wall wherein said first opening along said at least one wall is positioned adjacent to said laser discharge area,
    wherein said anode and said cathode of said electrode structure define a first plane with respect to one another and said first opening along said at least one wall and said laser discharge area define a second plane that is perpendicular to said first plane.

16. The laser chamber of claim 15, further comprising:

a second ancillary chamber fluidically coupled to said laser chamber by a second opening along said at least one wall, wherein said second opening along said at least one wall is positioned adjacent to said laser discharge area along said second plane.

17. The laser chamber of claim 16, further comprising:

a first flow guide enclosed within said first ancillary chamber, a second flow guide enclosed within said second ancillary chamber, said first flow guide and said second flow guide circulate gas in a second direction within respective said first ancillary chamber and said second ancillary chamber, wherein said gas circulating in a first direction and said gas circulating in a second direction are inter-supporting at said first opening along said at least one wall and said second opening along said at least one wall.

18. The laser chamber of claim 17, wherein said first flow guide enclosed within said first ancillary chamber and said second flow guide enclosed within said second ancillary chamber are a respective second blower and third blower.

* * * * *